United States Patent [19]
Auer et al.

[11] 3,891,234
[45] June 24, 1975

[54] TOY VEHICLE FOR TRANSPORTING AT LEAST THE VEHICLE OPERATOR

[75] Inventors: Robert Thomas Auer; Laurie Jay Campbell; Raymond J. Lohr; James Smith, all of Erie, Pa.

[73] Assignee: Marx Toys Division of The Quaker Oats Company, Stamford, Conn.

[22] Filed: Feb. 19, 1974

[21] Appl. No.: 443,878

Related U.S. Application Data

[63] Continuation of Ser. No. 234,120, March 13, 1972, abandoned.

[52] U.S. Cl. ................. 280/211; 280/250; 280/282
[51] Int. Cl. ............................................. B62m 1/14
[58] Field of Search ........... 280/1.1, 1.11, 211, 242, 280/249, 250, 282, 87.04 A

[56]  References Cited
UNITED STATES PATENTS

| | | | |
|---|---|---|---|
| 287,789 | 11/1883 | Arbogast............................ | 280/250 |
| 3,052,486 | 9/1962 | Malmquist.......................... | 280/211 |
| 3,630,540 | 12/1971 | Smith.................................. | 280/87.04 A |
| 3,712,397 | 1/1973 | Smith et al........................ | 280/1.11 R |

FOREIGN PATENTS OR APPLICATIONS

1,114,435   12/1955   France .......................... 280/1.11 A

*Primary Examiner*—Kenneth H. Betts
*Assistant Examiner*—Jack D. Rubenstein
*Attorney, Agent, or Firm*—Blum Moscovitz Friedman & Kaplan

[57]  ABSTRACT

A toy vehicle adapted to be occupied at least by the vehicle operator and capable of transporting at least the operator of the vehicle. The vehicle has a chassis in which the operator of the vehicle can be seated. Wheels are operatively connected with the chassis to support the latter for movement, and a pair of wheels at opposite sides of the chassis are coaxial and supported for rotary movement independently of each other. A pair of drives are respectively connected with the coaxial wheels to drive the latter, and these drives are controlled independently of each other by the operator so that in accordance with the manipulation of the controls the wheels can be driven independently of each other to direct the vehicle in a selected direction.

2 Claims, 7 Drawing Figures

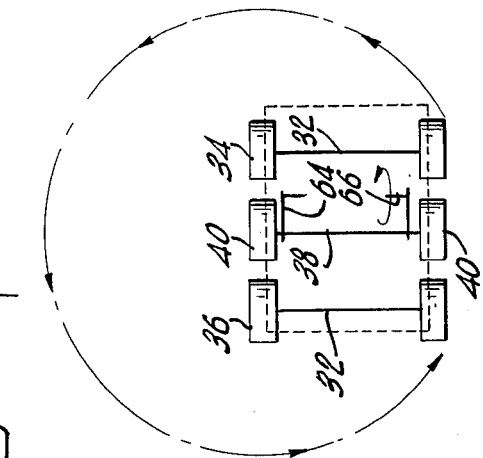
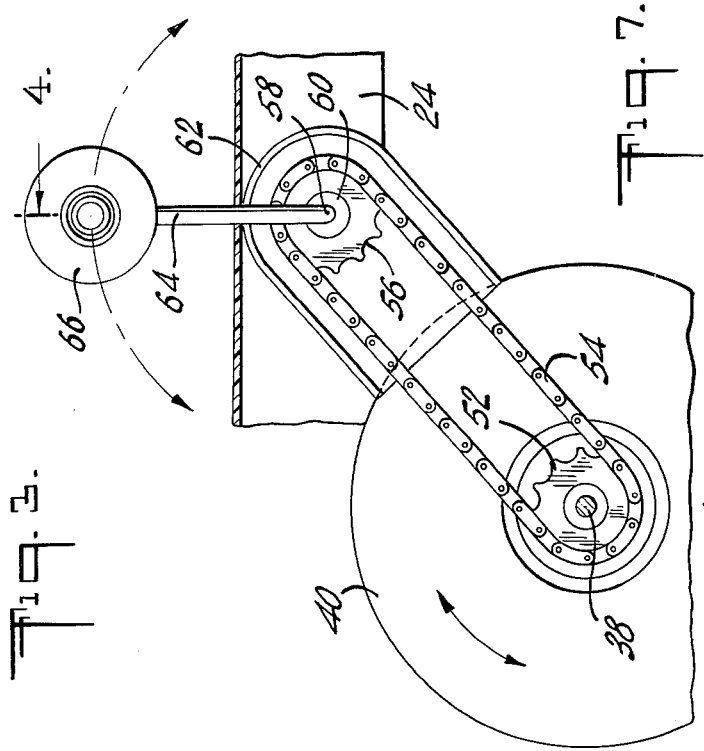
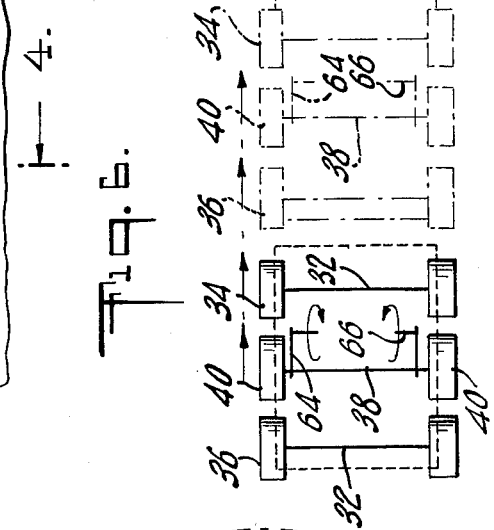
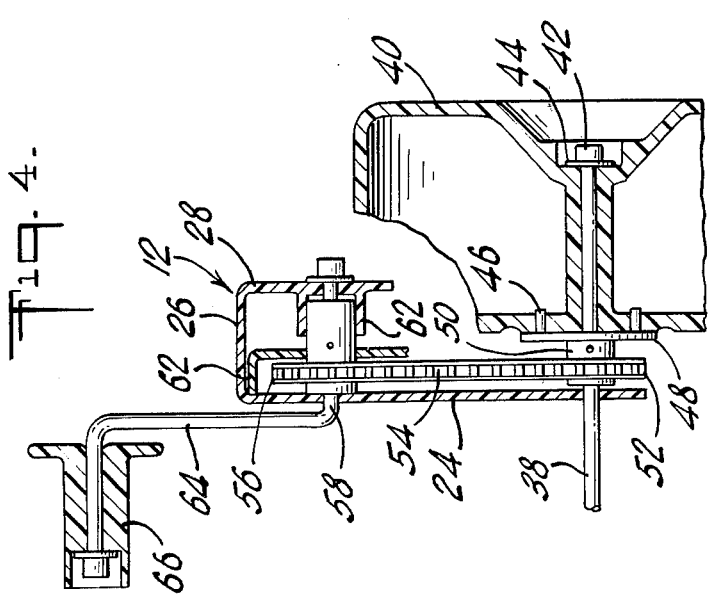
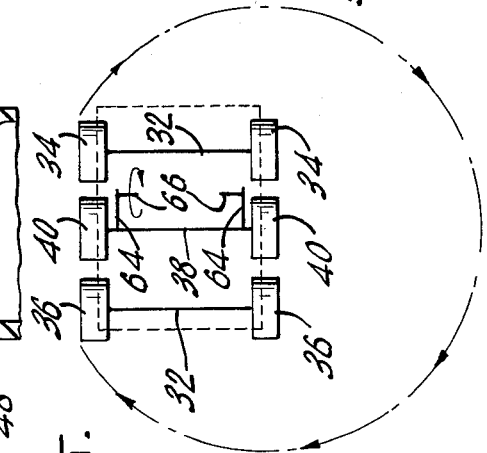

TOY VEHICLE FOR TRANSPORTING AT LEAST THE VEHICLE OPERATOR

This is a continuation of application Ser. No. 234,120, filed Mar. 13, 1972 now abandoned.

BACKGROUND OF THE INVENTION

The present invention relates to toy vehicles.

In particular, the present invention relates to toy vehicles which are large enough to be occupied by at least the operator of the vehicle so that the vehicle, while being a toy, nevertheless is capable of transporting at least the operator of the vehicle.

While vehicles of this general type are known, the conventional vehicles of this type suffer from several drawbacks. In the first place they are relatively complex since they are provided with expensive drives having a source of power and capable of being controlled by the operator. In addition, such conventional vehicles have relatively complex and expensive steering mechanisms. In addition to the above drawbacks, such conventional toy vehicles are considered dangerous because they are power-driven and operated by relatively young children. Where such vehicles are battery-operated, for example, there is the problem of maintaining a suitably charged battery at all times in the vehicle so that it can be operated properly. Toy vehicles which are electrically driven require complex electrical structures and also are dangerous to a young individual because of the electrical power which is used.

It is of course known to provide vehicles of this general type which are pedal-operated, using energy from the legs of the operator, but vehicles of this type, while safer than power-operated vehicles, still require independent complex steering mechanisms and have the disadvantage of appealing only to extremely young children.

SUMMARY OF THE INVENTION

It is accordingly a primary object of the present invention to provide a toy vehicle of the above general type which will avoid the above drawbacks.

In particular, it is an object of the present invention to provide a toy vehicle which is capable of carrying at least the operator of the vehicle and which can be controlled by the operator while at the same time being safer than power-driven vehicles.

In particular, it is an object of the present invention to provide a toy vehicle of this type which utilizes the energy of the operator in order to propel the vehicle but which at the same time will have an appeal to individuals much older than those to whom pedal-operated vehicles appeal.

In particular, it is an object of the present invention to provide a vehicle of the above general type which can be propelled by the operator while the operator is carried by the vehicle and which has an exceedingly simple mechanism capable of functioning not only to propel the vehicle but also to steer the vehicle, so that a separate steering mechanism is not required.

In addition it is an object of the present invention to provide a vehicle of this type which will form an excellent source of physical exercise and which at the same time will prove to be exceedingly entertaining.

Thus, it is an object of the present invention to provide a vehicle which can, in particular, be manipulated by the hands and arms of an operator in such a way that the vehicle can be propelled in any desired direction or turned as desired, with the rate of propulsion and direction of movement being easily controlled by the operator.

In addition it is an object of the present invention to provide a toy vehicle of this type which is exceedingly simple and inexpensive to manufacture while at the same time being extremely rugged and safe in its construction.

According to the invention the toy vehicle includes a chassis means for carrying at least an operator of the vehicle. A wheel means is located on opposite sides of the chassis means to support the latter for traveling movement. The wheel means includes a pair of coaxial wheels respectively located on opposite sides of the chassis means. A support means is operatively connected with the coaxial wheels to support the latter for free rotary movement independently of each other. A pair of drive means are carried by the chassis means and are operatively connected to the pair of coaxial wheels, respectively, for driving these coaxial wheels independently of each other. A pair of control means are accessible to the operator and are respectively connected operatively with the pair of drive means for controlling the latter as selected by the operator in order to propel the vehicle in a selected direction.

BRIEF DESCRIPTION OF DRAWINGS

The invention is illustrated by way of example in the accompanying drawings which form part of this application and in which:

FIG. 3 is a sectional elevation taken along line 3—3 of FIG. 2 in the direction of the arrows and fragmentarily illustrating details of a drive means and control means of the invention;

FIG. 4 is a sectional elevation taken along line 4—4 of FIG. 3 in the direction of the arrows and fragmentarily illustrating further details of the structure of the invention;

FIG. 5 is a schematic diagram showing one possible type of operation of the vehicle of the invention;

FIG. 6 is a schematic illustration of another type of operation; and

FIG. 7 is a schematic illustration of a further type of operation of the vehicle of the invention.

DESCRIPTION OF A PREFERRED EMBODIMENT

Figure 1:
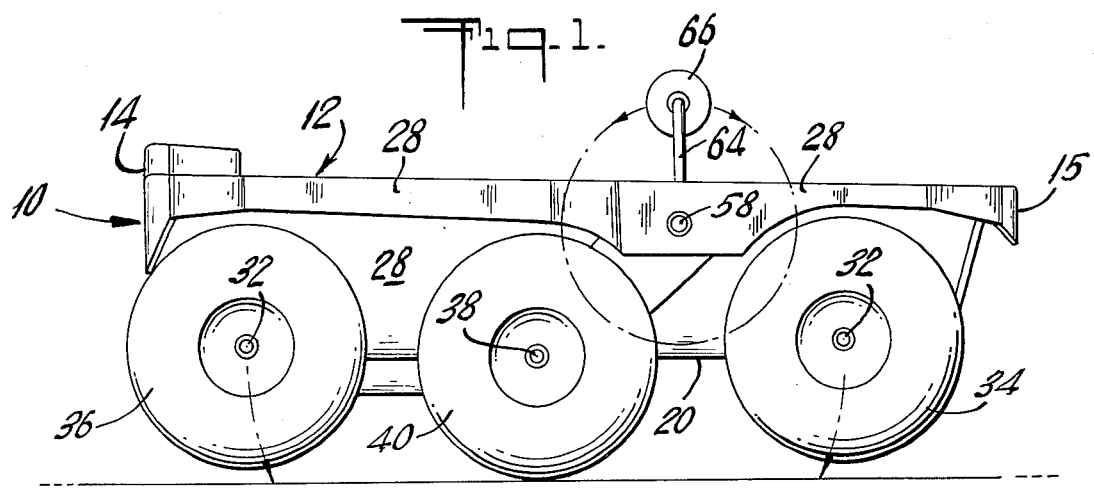
FIG. 1 is a side elevation of a vehicle according to the invention.

Referring to FIGS. 1-4, there is illustrated therein a vehicle 10 according to the present invention. This vehicle includes a chassis means 12 which is large enough to accommodate at least the operator of the vehicle. This chassis means 12 is molded from a suitable plastic material and includes the rear end 14 and the front end 15, the details of which are apparent from FIGS. 1 and 2. The rear end 14 of the chassis means 12 forms the back of a seat 16 on which the operator can be seated, and this seat 16 extends at its front wall 18 upwardly from a floor 20 which is formed on opposite sides of a central top portion of the plastic wall which forms the floor 20 with a pair of openings 22 for a purpose referred to below. The plastic sheet material which forms the chassis means 12 has a pair of inner opposed side walls 24 which extend substantially vertically at the interior of the chassis means 12 at opposite sides thereof, so that the operator becomes seated between these walls 24. The walls 24 merge at their top ends into an upper peripheral substantially flat wall portion 26 which extends all around the vehicle, along the side wall 24 and along the front end 15 as well as along the rear end 14. This peripheral wall portion 26 has at its outer edge a downwardly extending flange 28 which extends along the entire outer periphery of the vehicle.

Figure 2:
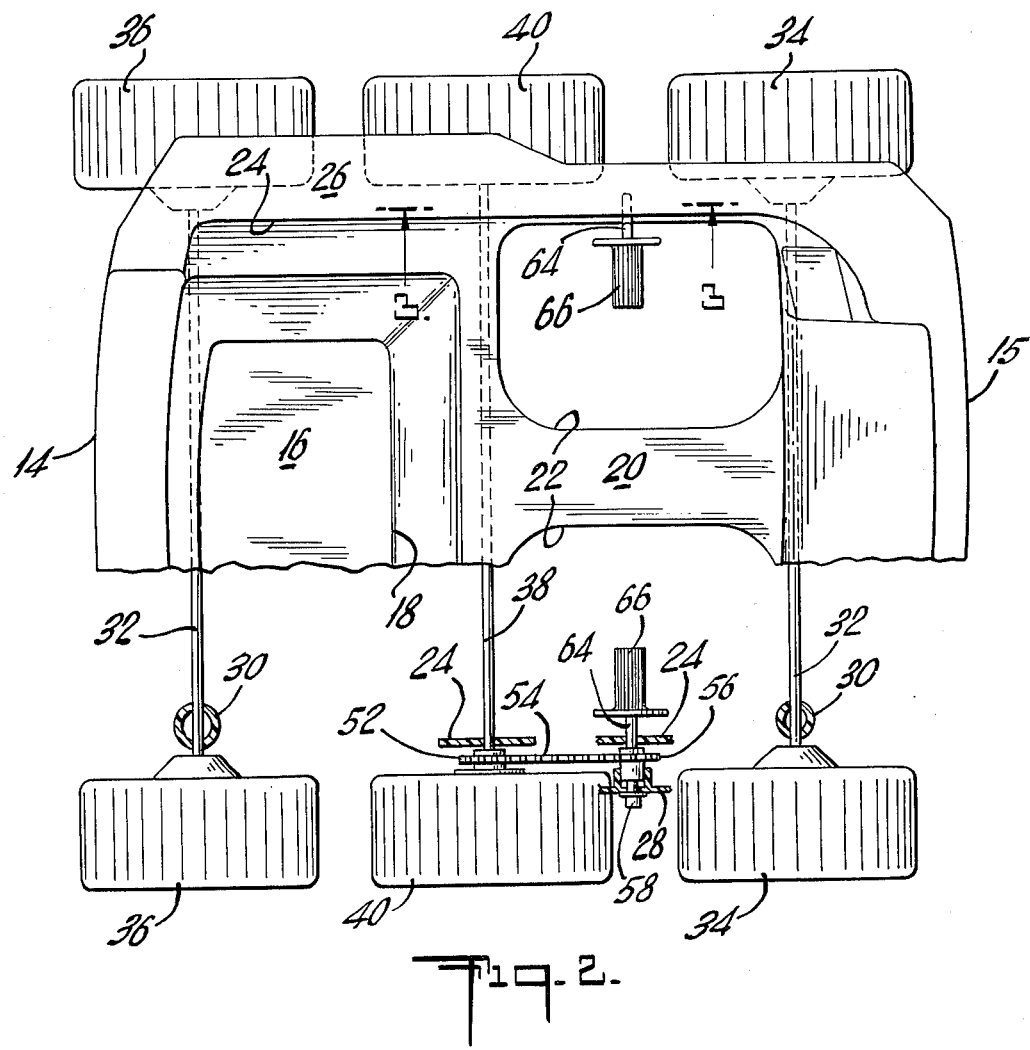
FIG. 2 is a top plan view of the vehicle of FIG. 1, the lower part of FIG. 2 showing in section one of the drives to one of the wheels in a top plan view as well as additional structure for supporting front and rear wheels.

The plastic sheet material which forms the chassis means 12 includes four tubular portions 30, two of which are apparent in FIG. 2. These tubular portions are formed with transverse openings for receiving portions of shafts 32. A pair of these shafts 32 are situated at the region of the front and rear ends of the chassis means 12, and beyond the tubular supports 30 for the shafts 32, these shafts carry suitable bearings on which wheels 34 and 36 are mounted for free rotary movement on the shafts 32. Thus, there are a pair of front wheels 34 and a pair of rear wheels 36.

The side walls 24, at portions beneath the floor 20 are formed with a pair of aligned openings receiving a shaft 38 which forms a support means for a pair of coaxial intermediate wheels 40. Referring to FIG. 4 it will be seen that the wheel 40 illustrated therein is freely turnable on the shaft 38 which forms the support means for the wheel 40. This wheel 40 is held on the shaft 38 by any structure such as a nut 42 and a washer 44. At its inner hub portion the wheel 40 is formed with openings which respectively receive pins 46 fixed to and projecting from a plate 48 which forms a flange projecting radially from a tubular sleeve 50 which is freely turnable on the shaft 38 so the shaft 38 forms a bearing for the sleeve 50 which is fixed to the wheel 40 in order to compel the latter to rotate with the sleeve 50. The sleeve 50 is rotated by way of a sprocket 52 (FIG. 3) which is fixed to the sleeve 50 and which meshes with a sprocket chain 54. The chain 54 in turn meshes with a sprocket 56 which is fixed to a rotary shaft 58. The rotary shaft 58 is supported for rotary movement in a bearing 60 which is carried by a tubular portion 62 integral with the peripheral wall 28, and the bearing 60 is also received in an opening of a wall 62 of the chassis means 12. The shaft 58 extends through an opening in the side wall 24, and in the interior of the vehicle adjacent the wall 24 the rotary shaft 58 is fixed with and in fact forms an extension of the hand crank 64 provided with a handle 66 to be grasped by the operator. This handle 66 is freely rotatable on the inner arm of the crank 64. Thus, the shaft 58 together with the sprocket wheel 56 which is fixed thereto and the sprocket chain 54 and sprocket 52 form a drive means for driving a wheel 40 such as that shown in FIGS. 3 and 4. This drive means is controlled by way of the hand crank 64 which thus forms a control means for controlling the drive means.

As is apparent from FIG. 2, a pair of these drive means and control means are provided, with one drive means and control means being situated at one side of the vehicle to operate one wheel 40 and the other drive means and control means being situated at the opposite side of the chassis means for driving the other wheel 40. Thus, the pair of coaxial wheels 40 are capable of being driven independently of each other through the pair of drive means in accordance with the manipulation of the pair of control means which are respectively formed by the pair of hand cranks.

In addition it will be noted from FIG. 1 that the peripheries of the front and rear wheels 34 and 36 have an elevation with respect to the periphery of the intermediate coaxial wheels 40 which will enable the vehicle to rock forwardly around the axis of the shaft 38 onto the front wheels 34 or rearwardly around the axis of the shaft 38 onto the rear wheels 36.

The openings 22 are provided so that when the operator, who is positioned on the seat 16, rotates the hand cranks, there will be sufficient clearance for the hands of the operator in the openings 22.

With the above vehicle the operator will position himself on the seat 16 and will grasp the pair of handles 66. Now the operator will turn these handles 66 in one direction or the other depending upon the direction in which the operator wishes to propel the vehicle.

Thus, referring to FIG. 6 it will be seen that the operator can simultaneously rotate both of the hand cranks at the same speed and in the same direction so as to achieve the propelling of the vehicle along a straight line to the right, as viewed in FIG. 6. In the same way the operator can reverse the rotation of the pair of hand cranks and bring about rearward movement of the vehicle to the left, as viewed in FIG. 6.

Moreover, as is apparent from FIG. 5, the operator can maintain the right hand crank stationary while rotating only the left hand crank, to bring about a clockwise turning of the vehicle, as viewed in FIG. 5. Also, as shown in FIG. 7 the operator can maintain the left hand crank stationary while rotating only the right hand crank, and this will bring about a counterclockwise rotation of the vehicle, as illustrated in FIG. 7. Of course, by providing any desired relationship between the speeds of rotation of the pair of hand cranks it is possible for the operator to steer the vehicle in any desired direction or simply to carry out stationary turning of the vehicle as shown in FIGS. 5 and 7.

These turning or steering operations are enhanced by the rocking movement which the operator can bring about simply by displacing the weight of his body. By rocking the vehicle the frictional resistance of the front or rear wheels to turning of the vehicle is very greatly reduced so that after some practice the operator can learn how skillfully to distribute his weight in the vehicle to bring about a minimal frictional resistance to turning of the vehicle whenever the hand cranks are rotated differently from each other.

It is thus apparent that with the above-described structure of the invention the operator of the vehicle will achieve considerable amount of exercise. The speed of the vehicle will be determined solely by the energy which the operator wishes to put into the vehicle. Moreover, the operator can rock the vehicle as desired while bringing about sharp turns in a highly entertaining manner. It has been found that the vehicle of the invention has a great appeal not only to relatively young children but to teenagers and adults because of the exercise and the entertainment which is achieved during operation of the vehicle of the invention.

At the same time it is to be noted that the vehicle is quite rugged and simple so that it can be manufactured and sold at low cost. In addition it is exceedingly safe to operate.

What is claimed is:

1. In a toy vehicle a molded chassis for carrying at least an operator of the vehicle the rear end of said chassis forming the back of a seat on which the operator can be seated, the seat extending at a front wall thereof upwardly from a floor portion, said floor portion being formed with a central portion which defines two openings in said floor said central portion providing structural support to said chassis and the openings defined thereby providing sufficient clearance for the hands of an operator seated in the seat of said chassis and wheel means located at opposite sides of said chassis for supporting the latter for traveling movement, said wheel means including a pair of intermediate coaxial wheels respectively located at opposite sides of said chassis means between opposed ends thereof, a single shaft common to said pair of intermediate coaxial wheels and rotatably supporting same for free rotary movement independently of each other, a pair of drive means carried by said chassis and operatively connected to said pair of intermediate coaxial wheels, respectively, for driving said intermediate coaxial wheels independently of each other, and a pair of control means accessible to the operator and respectively connected operatively with said pair of drive means for controlling the latter as selected by the operator to propel the vehicle in a selected direction said wheel means further including at least two pairs of coaxial wheels respectively situated forwardly and rearwardly of said pair of intermediate coaxial wheels, said front and rear wheels respectively having peripheries situated with respect to the periphery of said pair of intermediate coaxial wheels at elevations which provide for said chassis means a rocking movement around the common axis of said intermediate coaxial wheels forwardly onto said front wheels or rearwardly onto said rear wheels said chassis including inner opposed side walls which extend substantially perpendicular to said seat and floor portion at opposite sides thereof, said side walls defining restraining walls for an operator seated therebetween, and also includes two pairs of tubular portions formed with transverse openings therein, the first pair of said tubular portions being rearward of said single shaft and said other pair of tubular portions being forward of said single shaft, and a forward shaft and rearward shaft for respectively supporting said front and rear wheels, said shafts being rotatably supported in said pairs of tubular portions transverse openings, said openings being disposed to provide said rocking movement to said forward and rearward wheels about said intermediate wheels, by being at a higher elevation than said single shaft.

2. The combination of claim 1 and wherein said pair of control means are respectively in the form of a pair of rotary hand cranks, said pair of hand cranks being coaxial but oppositely oriented and respectively having handles directed inwardly toward each other so as to be accessible to the operator to be rotated by the operator, said hand cranks being respectively situated forwardly of and at an elevation higher than said pair of intermediate coaxial wheels, said pair of drive means respectively including one pair of sprockets respectively connected with said hand cranks to be rotated thereby, a second pair of sprockets respectively connected with said pair of intermediate coaxial wheels, and a pair of chains respectively transmitting rotary movement from the sprockets connected to the hand cranks to the sprockets connected to the pair of intermediate coaxial wheels for transmitting rotary movement of said pair of hand cranks to said pair of intermediate coaxial wheels, said wall portions separating said sprockets and chains from the interior of the chassis where the operator is located.

\* \* \* \* \*